US010110101B2

(12) United States Patent  
Ono (10) Patent No.: US 10,110,101 B2  
(45) Date of Patent: Oct. 23, 2018

(54) SINGLE-PHASE INDUCTION MOTOR, HERMETIC COMPRESSOR, AND REFRIGERATION CYCLE DEVICE

(71) Applicant: Mitsubishi Electric Corporation, Tokyo (JP)

(72) Inventor: Masashi Ono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 106 days.

(21) Appl. No.: 14/601,487

(22) Filed: Jan. 21, 2015

(65) Prior Publication Data

US 2015/0236574 A1 Aug. 20, 2015

(30) Foreign Application Priority Data

Feb. 20, 2014 (JP) ................................ 2014-030955

(51) Int. Cl.
*H02K 17/04* (2006.01)
*F04C 18/34* (2006.01)
(Continued)

(52) U.S. Cl.
CPC ............. *H02K 17/04* (2013.01); *F04C 18/34* (2013.01); *F04C 18/3564* (2013.01);
(Continued)

(58) Field of Classification Search
CPC .......... H02K 19/06; H02K 7/14; H02K 17/08; H02K 17/04; H02K 1/16; H02K 1/12;
(Continued)

(56) References Cited

U.S. PATENT DOCUMENTS 4,859,889 A * 8/1989 Andrews .................. H02K 5/26  
    310/89  
2004/0219037 A1* 11/2004 Higuchi ................ F04C 18/328  
    417/410.3  
(Continued)

FOREIGN PATENT DOCUMENTS

CN      101151781 A     3/2008  
JP      S55-136854 A    10/1980  
(Continued)

OTHER PUBLICATIONS

JP 2011188703 A (English Translation).*  
(Continued)

*Primary Examiner* — Joshua Benitez Rosario  
*Assistant Examiner* — Alexander Moraza  
(74) *Attorney, Agent, or Firm* — Posz Law Group, PLC (57) ABSTRACT

The single-phase induction motor includes a stator fixed in a cylindrical frame by shrink-fitting or press-fitting, a main winding wire and an auxiliary winding wire provided on the stator, and a rotor provided on an inner circumferential side of the stator, in which an arc-shaped arc portion and a linear cutout portion are formed on an outer circumference of the stator, the arc portion is arranged on the outer circumference of the stator in a direction of the main winding wire magnetic pole with respect to the center of the stator, and a relief portion for reducing a contact area between the arc portion and an inner circumferential surface of the frame is formed on the arc portion.

8 Claims, 5 Drawing Sheets

(51) Int. Cl.
- *F04C 29/00* (2006.01)
- *H02K 1/12* (2006.01)
- *F04C 23/00* (2006.01)
- *F04C 18/356* (2006.01)
- *H02K 1/16* (2006.01)
- *H02K 7/14* (2006.01)
- *H02K 17/08* (2006.01)

(52) U.S. Cl.
CPC ........ *F04C 23/008* (2013.01); *F04C 29/0085* (2013.01); *H02K 1/12* (2013.01); *H02K 1/16* (2013.01); *H02K 7/14* (2013.01); *H02K 17/08* (2013.01); *F04C 2210/26* (2013.01); *F04C 2240/40* (2013.01)

(58) Field of Classification Search
CPC .. F04C 18/34; F04C 18/3564; F04C 2210/26; F04C 2240/40; F04C 23/008; F04C 29/0085
USPC .................................. 310/166, 216.113, 210
See application file for complete search history.

(56) References Cited

U.S. PATENT DOCUMENTS

| | | | | |
|---|---|---|---|---|
| 2009/0289521 A1* | 11/2009 | Yoshino | ................ | H02K 17/08 310/216.071 |
| 2010/0021321 A1* | 1/2010 | Koike | ................ | F04B 39/0044 417/410.3 |
| 2011/0081263 A1* | 4/2011 | Yoshino | ................ | F04C 23/008 417/410.1 |

FOREIGN PATENT DOCUMENTS

| | | | |
|---|---|---|---|
| JP | 2001-268824 A | | 9/2001 |
| JP | 2005-354870 A | | 12/2005 |
| JP | 2006-115581 A | | 4/2006 |
| JP | 2010-075011 A | | 4/2010 |
| JP | 4485262 B2 | * | 6/2010 |
| JP | 4559872 B2 | | 7/2010 |
| JP | 2011188703 A | * | 9/2011 |
| WO | 2007/116431 A1 | | 10/2007 |

OTHER PUBLICATIONS

JP4485262B2 (English Translation).*
Office Action dated Mar. 21, 2017 issued in corresponding JP patent application No. 2014-030955 (and English translation).
Office Action dated Dec. 5, 2016 issued in corresponding CN application No. 201510082828.0 (and English translation).
Chinese Office Action dated Jun. 13, 2017 issued in corresponding CN patent application No. 20150082828.0 (and English translation).
Office Action dated Nov. 14, 2017 issued in corresponding CN patent application No. 201510082828.0 (and English translation).

* cited by examiner

SINGLE-PHASE INDUCTION MOTOR, HERMETIC COMPRESSOR, AND REFRIGERATION CYCLE DEVICE

BACKGROUND OF THE INVENTION

Field of the Invention

The present invention relates to a single-phase induction motor, a hermetic compressor, and a refrigeration cycle device.

Description of the Related Art

Patent Literature 1 describes a motor in which substantially semicircular cutout portions arranged at a 1-slot pitch or a plural-slot pitch with respect to a stator outer diameter are provided.

Patent Literature 2 describes a single-phase motor configured to have a cutout portion having a width substantially equal to a stator tooth on an outer circumferential portion of a stator core and not to have the cutout portion on an outer circumferential side of a slot into which a main winding wire is inserted.

CITATION LIST

Patent Literature

Patent Literature 1: Japanese Patent Laid-Open No. 2001-268824
Patent Literature 2: Japanese Patent No. 4559872

In general, magnetic flux density of a stator core back tends to be high in the single-phase induction motor. Particularly if a cutout portion is provided in the stator as in Patent Literature 1 and Patent Literature 2, a core back magnetic path of a portion where the cutout portion is provided becomes short, and the magnetic flux density tends to be high. As a result, not only that iron loss in the core back increases but also an electric current flowing through a main winding wire and an auxiliary winding wire required for generation of a torque increases and copper loss also increases and thus, there is a problem that efficiency of a motor deteriorates.

The present invention was made in order to solve the above-described problem and has an object to provide a single-phase induction motor, a hermetic compressor, and a refrigeration cycle device which can improve efficiency.

SUMMARY OF THE INVENTION

A single-phase induction motor according to the present invention includes a stator fixed in a cylindrical frame by shrink-fitting or press-fitting, a main winding wire and an auxiliary winding wire provided on the stator, and a rotor provided on an inner circumferential side of the stator, in which in a cross-section of the stator, an arc-shaped arc portion and a linear cutout portion are formed on an outer circumference of the stator, the arc portion is provided on the outer circumference of the stator in a magnetic pole direction of the main winding wire with respect to a center of the stator, and a relief portion for reducing a contact area between the arc portion and an inner circumferential surface of the frame is formed on the arc portion.

Moreover, a hermetic compressor according to the present invention includes the above-described single-phase induction motor.

Moreover, in a refrigeration cycle device according to the present invention, the above-described hermetic compressor is used.

According to the present invention, a compression stress generated in the vicinity of the cutout portion of the stator can be relaxed, and the magnetic flux density in the vicinity of the cutout portion can be reduced and thus, iron loss of the stator can be reduced. Therefore, efficiency of the single-phase induction motor can be improved.

DETAILED DESCRIPTION OF THE PREFERRED EMBODIMENT

Embodiment 1

Figure 1:
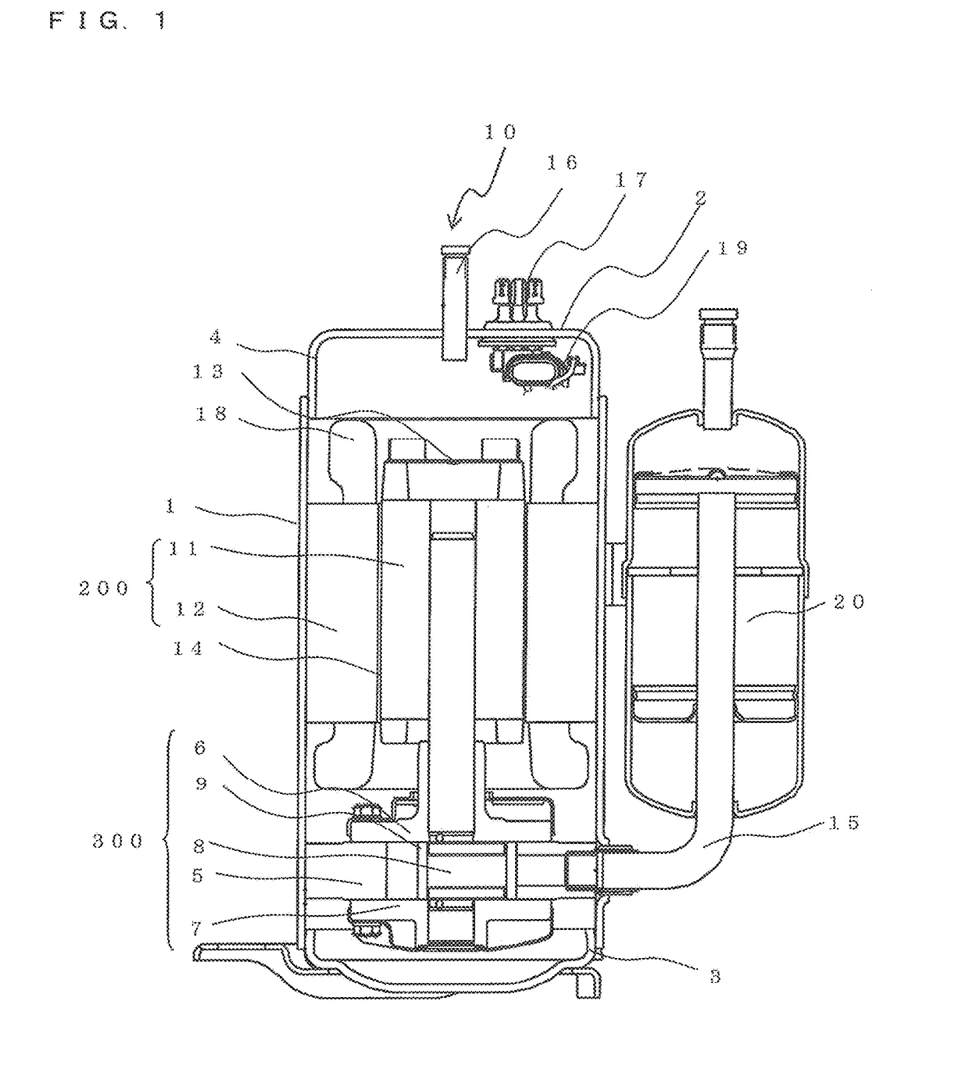
FIG. 1 is a vertical sectional view illustrating a schematic configuration of a hermetic compressor according to Embodiment 1 of the present invention.

A single-phase induction motor, a hermetic compressor, and a refrigeration cycle device according to Embodiment 1 of the present invention will be described. FIG. 1 is a vertical sectional view illustrating a schematic configuration of a hermetic compressor 10 according to this embodiment. In this embodiment, a rolling-piston type rotary compressor is exemplified as the hermetic compressor 10. In the following drawings including FIG. 1, relationships between dimensions, shapes and the like of components might be different from actual ones.

As illustrated in FIG. 1, the hermetic compressor 10 includes a compression element 300 for compressing a refrigerant suctioned from outside, a motor element 200 (single-phase induction motor) connected to the compression element 300 by a driving shaft 8 and for driving the compression element 300, and a sealed container 4 for accommodating the compression element 300 and the motor element 200. In a bottom part in the sealed container 4, refrigerating machine oil (lubricant oil) to be supplied to a sliding portion of the compression element 300 and the like is stored.

The sealed container 4 includes a body part 1 having a cylindrical shape, an upper-disc container 2 mounted on an upper part of a body part 1, and a lower-disc container 3 mounted on a lower part of the body part 1. At least a part of the body part 1 forms a cylindrical frame supporting an outer circumferential surface of a stator 12 which will be described later.

The compression element 300 includes a cylinder 5, an upper bearing 6, a lower bearing 7, the driving shaft 8, a rolling piston 9 and a vane (not shown) and the like. A compression chamber is formed inside the cylinder 5. The upper bearing 6 and the lower bearing 7 close opening ports formed on both ends in an axial direction of the compression chamber in the cylinder 5. The upper bearing 6 and the lower bearing 7 support a compression load received by an eccentric core portion of the driving shaft 8. The rolling piston 9 is fitted with an outer circumference of the eccentric core portion of the driving shaft 8. The vane reciprocates in a vane groove formed in an inner circumferential surface of the cylinder 5, and a tip end of the vane is brought into contact with the rolling piston 9. The cylinder 5, the rolling piston 9, and the vane form the compression chamber.

The motor element 200 has the stator 12 fixed to the body part 1 of the sealed container 4 and a rotor 11 rotating inside the stator 12. The rotor 11 is a basket-shaped rotor made of aluminum die-cast. The driving shaft 8 is fixed to an inner circumferential portion of the rotor 11. An oil separation plate 13 is attached to an upper part of the rotor 11. As a result, when the hermetic compressor 10 is operated, a refrigerant gas and the lubricant oil passing through an air gap 14 are separated.

A winding wire 18 (a main winding wire 26 and an auxiliary winding wire 27 which will be described later) of the stator 12 is connected to a glass terminal 17 through a lead wire 19. The glass terminal 17 is fixed to the sealed container 4 by welding. Electric power is supplied from an external power source to the glass terminal 17.

The hermetic compressor 10 is provided with a suction muffler 20 outside the sealed container 4. The suction muffler 20 is provided so that a liquid refrigerant is not suctioned directly into the compression element 300. A suction pipe 15 of the suction muffler 20 is connected to the cylinder 5 of the compression element 300. A high-temperature/high-pressure gas refrigerant compressed by the compression element 300 passes through the motor element 200 and is discharged from a discharge pipe 16 to the outside.

Figure 2:
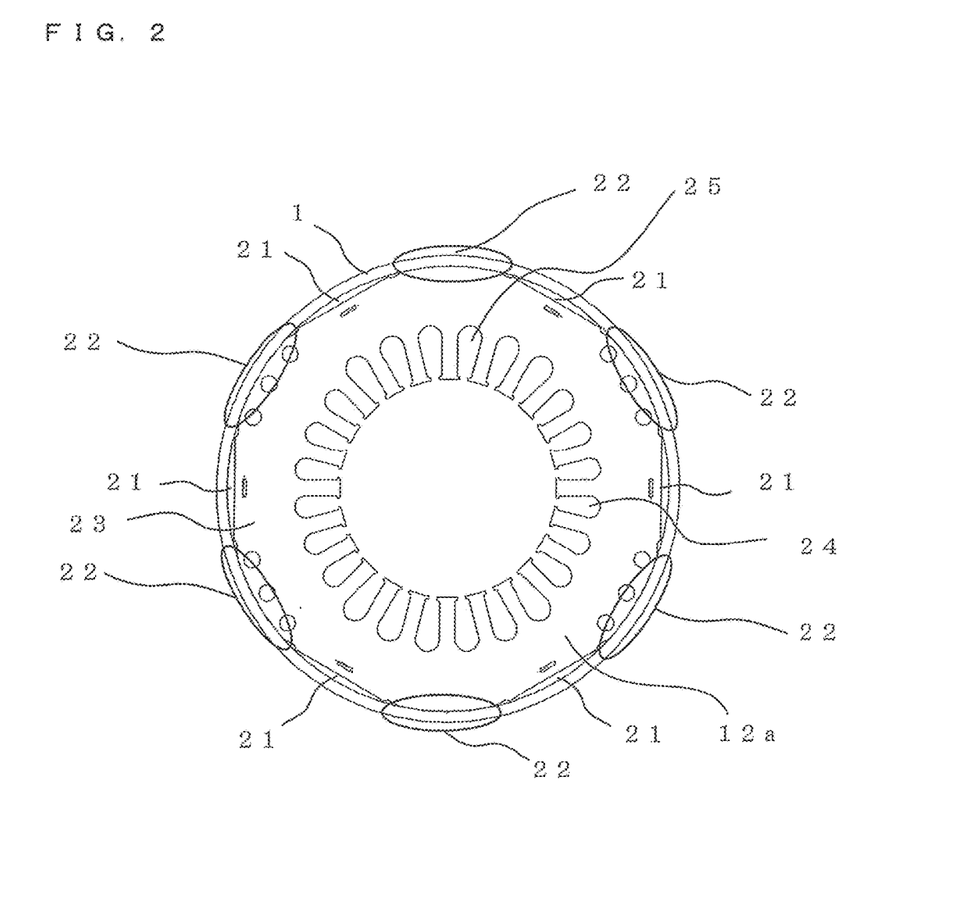
FIG. 2 is a cross sectional view illustrating a configuration of a part of a single-phase induction motor according to embodiment 1 of the present invention.

The stator 12 used in the motor element 200 (single-phase induction motor) of the above-described hermetic compressor 10 will be described below by referring to FIG. 2. FIG. 2 is a cross sectional view illustrating a configuration of a part of the motor element 200 (the body part 1 of the sealed container 4 and a stator core 12a of the stator 12). The stator core 12a is formed by laminating a plurality of stator core plates, each being formed of an electromagnetic steel plate which is a magnetic body, in the axial direction (a direction perpendicular to a paper surface in FIG. 2). A plate thickness of each of the stator core plates is approximately 0.1 to 1 mm. The stator core 12a has a substantially circular outer circumferential shape as a whole. On an outer circumferential portion of the stator core 12a, six cutout portions 21 arranged at equal intervals in a circumferential direction are provided. The cutout portion 21 has a shape in which the substantially circular outer circumferential portion of the stator core 12a is linearly cutout. When the stator 12 is inserted into the cylindrical body part 1, a cavity (gap) is formed between the cutout portion 21 and an inner circumferential surface of the body part 1. Moreover, on the outer circumferential portion of the stator core 12a, six arc portions 22 are provided along an entire outer circumferential circle of the stator core 12a. The six arc portions 22 are arranged at equal intervals in the circumferential direction of the stator core 12a. Each of the arc portions 22 is arranged between the cutout portions 21 adjacent to each other in the circumferential direction of the stator core 12a. That is, on the outer circumferential portion of the stator core 12a, the arc-shaped arc portions 22 and the linear cutout portions 21 are disposed alternately. The arc portion 22 is a portion in contact or brought close to the inner circumferential surface of the body part 1 when the stator 12 is inserted into the cylindrical body part 1. The arc portion 22 has an arc shape substantially along the inner circumferential surface of the body part 1. A detailed shape of the arc portions 22 will be described later.

The stator core 12a has a substantially annular core back 23. In the inner circumferential portion of the stator core 12a (core back 23), a plurality of small slots 24 with a small slot depth and large slots 25 having a slot depth larger than that of the small slots 24 are formed as a plurality of slots with different slot depths. In this embodiment, the slot at a position where the cutout portion 21 or a through hole 31 for stress relaxation which will be described later is provided is referred to as the small slot 24, basically. This is because a magnetic path (width) of the core back 23 is to be made as long as possible so as to relax magnetic flux density saturation. The slot at a position other than that is made the large slot 25. A main winding wire 26 and an auxiliary winding wire 27 which will be described later are inserted into the small slot 24 and the large slot 25. The main winding wire 26 is mainly inserted into the small slot 24, while the auxiliary winding wire 27 is mainly inserted into the large slot 25.

The stator 12 is fixed to the body part 1 of the sealed container 4 by shrink-fitting or press-fitting. When the shrink-fitting is to be performed, an inner diameter of the body part 1 is set smaller than an outer diameter of the stator 12 at a normal temperature. Then, the body part 1 is heated to approximately 200 degrees C. by electromagnetic induction heating or the like, the inner diameter of the body part 1 is enlarged so as to become larger than the outer diameter of the stator 12 at the normal temperature by thermal expansion, and after the stator 12 is inserted into the body part 1, the temperature is returned to the normal temperature. When the body part 1 returns to the normal temperature, the body part 1 and the stator 12 are fixed together. A fit margin (shrink-fit margin) between the body part 1 and the stator 12 is selected as appropriate in a range of several tens to several hundreds μm in accordance with a weight of the stator 12 and the like. The fit margin (shrink-fit margin) is a difference between the outer diameter of the stator 12 and the inner diameter of the body part 1 at the normal temperature (outer diameter of the stator 12>inner diameter of the body part 1).

In a state in which the stator 12 is inserted into the body part 1, by applying a pressure on the arc portion 22 from the inner circumferential surface of the body part 1, a compression stress concentrates on the core back 23 or particularly on the core back 23 close to top portions (a portion on the outermost circumferential side of each slot) of the small slot 24 and the large slot 25.

Figure 3:
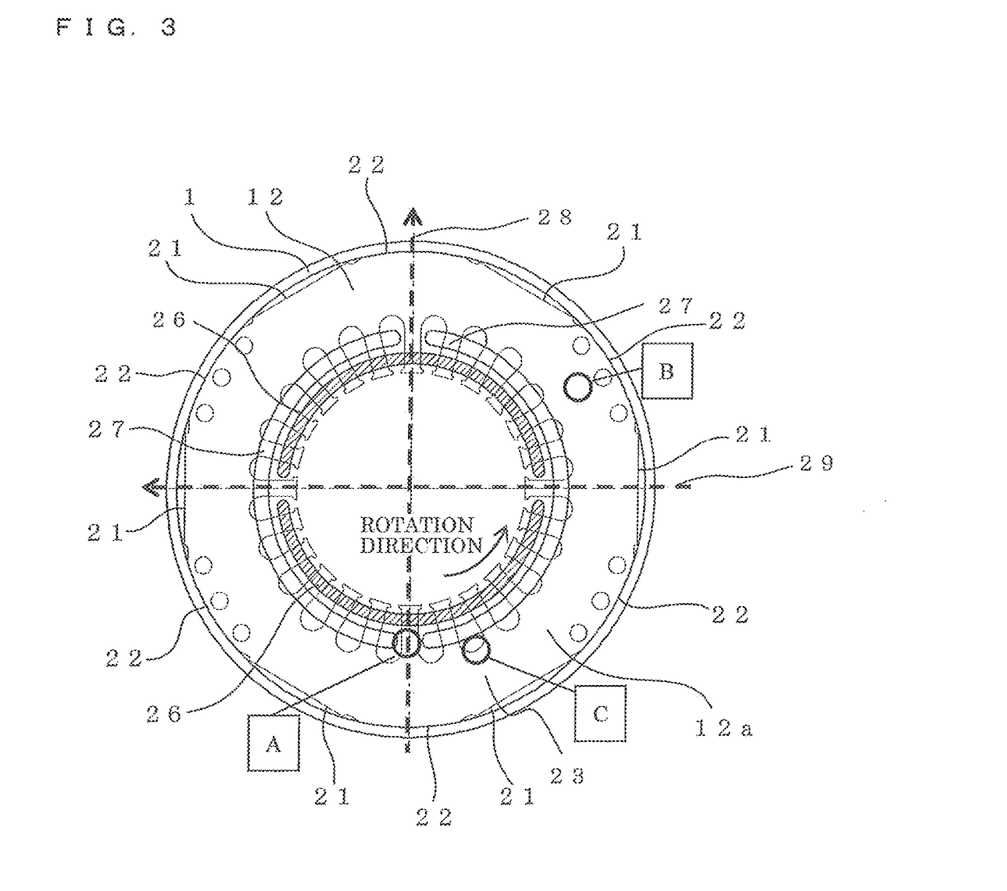
FIG. 3 is a view illustrating arrangement of a main winding wire and an auxiliary winding wire inserted into a small slot and a large slot of a stator using a concentric winding method in the single-phase induction motor according to embodiment 1 of the present invention.

FIG. 3 is a view illustrating arrangement of the main winding wire 26 and the auxiliary winding wire 27 inserted (wound) into the small slot 24 and the large slot 25 of the stator 12 in the concentric winding manner. As illustrated in FIG. 3, a direction of a main winding wire magnetic pole 28 (broken-line arrow) generated by making an electric current flow through the main winding wire 26 is directed upward in the figure. Since the current flowing through the main winding wire 26 is an alternating current, a vector of the main winding wire magnetic pole 28 changes in accordance with the alternating current.

A direction of an auxiliary winding wire magnetic pole 29 (broken-line arrow) generated by making an electric current flow through the auxiliary winding wire 27 is offset in a counterclockwise direction only by a magnetic pole angle of 90 degrees with respect to the direction of the main winding wire magnetic pole 28 with respect to the center of the stator. Since the current flowing through the auxiliary winding wire 27 is also an alternating current, a vector of the auxiliary winding wire magnetic pole 29 also changes in accordance with that. Since the current flowing through the auxiliary winding wire 27 advances in a phase more than the current flowing through the main winding wire 26, a direction of a rotating magnetic field generated by the main winding wire 26 and the auxiliary winding wire 27 of the stator 12 is a counterclockwise direction. Thus, a rotating direction of the rotor 11 indicated by a solid-line arrow in FIG. 3 is also a counterclockwise direction.

A magnetic flux density of the core back 23 tends to be high particularly in a 2-pole rotating magnetic field due to a magnetic field generated by the stator 12. If the magnetic flux density becomes too high (saturated), not only that iron loss in the core back 23 increases, but the current flowing through the main winding wire 26 and the auxiliary winding wire 27 required for generating a torque increases and copper loss also increases, whereby efficiency of the single-phase induction motor is deteriorated.

The main winding wire magnetic pole 28 is a magnetic field for generating a main torque and its magnetic flux density is larger than the auxiliary winding wire magnetic pole 29. On the other hand, in a portion where the cutout portion 21 is formed, since the magnetic path of the core back 23 is short, the magnetic flux density can be saturated easily. Thus, in this embodiment, the cutout portion 21 is not provided in the direction of the main winding wire magnetic pole 28 with respect to the center of the stator and a direction opposite to that with respect to the center of the stator (i.e. the cutout portion is not provided on the vertical axis passing through the center of the stator in FIG. 3), but the cutout portion 21 is provided in the direction of the auxiliary winding wire magnetic pole 29 and a direction opposite to that with respect to the center of the stator (i.e. the cutout portion is provided on the horizontal axis passing the center of the stator in FIG. 3). As a result, since an increase in the magnetic flux density in the portion where the cutout portion 21 is formed can be suppressed, the increase in the iron loss can be suppressed, and efficiency of the single-phase induction motor can be improved.

Moreover, in this embodiment, winding wires are configured such that the main winding wire 26 is inserted after the auxiliary winding wire 27 is inserted into the slot. Thus, the auxiliary winding wire 27 is arranged on the outer circumferential side of the slot, while the main winding wire 26 is arranged on the inner circumferential side (inner circumferential side from the auxiliary winding wire 27) of the slot. The main winding wire 26 arranged on the inner circumferential side can make a circumferential length of the winding wire shorter than that of the auxiliary winding wire 27 arranged on the outer circumferential side, and a resistance value can be made lower.

Since the resistance value of the main winding wire 26 lowers, a maximum torque that can be generated when the same voltage is applied (stalling torque) can be made higher. In other words, even if an applied voltage lowers in an environment with poor power source circumstances, an operable torque can be generated, and a reliable single-phase induction motor can be obtained.

Figure 4:
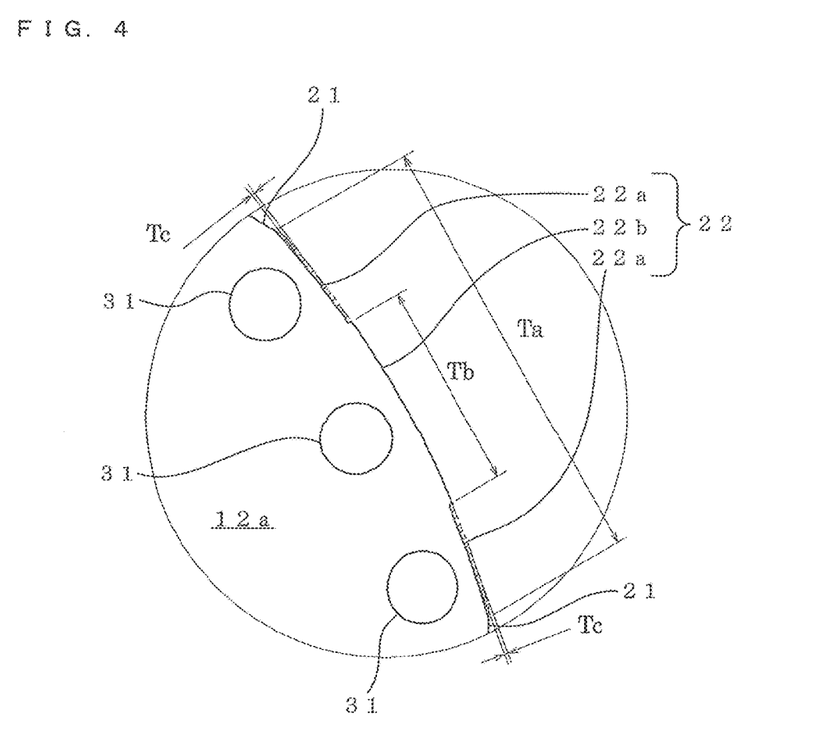
FIG. 4 is an enlarged view illustrating a configuration of the vicinity of an arc portion on which a relief portion is formed in the single-phase induction motor according to embodiment 1 of the present invention.

Moreover, in the arc portion 22 (all the six arc portions 22 in this embodiment) located at least in the direction of the main winding wire magnetic pole 28 with respect to the center of the stator (vertical direction in FIG. 3), a relief portion 22a for reducing a contact area between the arc portion 22 and the inner circumferential surface of the body part 1 is formed. FIG. 4 is an enlarged view illustrating a configuration in the vicinity of the arc portion 22 in which the relief portion 22a is formed. As illustrated in FIG. 4, the relief portions 22a are formed adjacently to the cutout portion 21 and on both end portions in the circumferential direction of the arc portion 22. The relief portion 22a in this embodiment has a shape in which a surface (outer circumferential surface) of the arc portion 22 is removed to a certain depth over a predetermined length in the circumferential direction. Thus, the surface (outer circumferential surface) of the relief portion 22a has an arc shape concentric to the arc portion 22 and having a radius smaller than that of the arc portion 22. After the stator 12 is fixed to the body part 1, the relief portion 22a is configured to be separated away from the inner circumferential surface of the body part 1. That is, the relief portion 22a is faced with the inner circumferential surface of the body part 1 via a predetermined gap. In the arc portion 22, a portion other than the relief portion 22a is a contact region 22b in contact with the inner circumferential surface of the body part 1. In this embodiment, the contact region 22b is arranged at a center part in the circumferential direction of the arc portion 22 and it protrudes to the outer circumferential side, in a shape of a protrusion on the basis of the relief portion 22a. In this embodiment, though the relief portions 22a are formed on the both end portions in the circumferential direction of the arc portion 22, but it is only necessary that the relief portion 22a is formed on a part of the arc portion 22. If the relief portion 22a is formed by being sandwiched by the contact regions 22b, the shape of the relief portion 22a becomes a recessed shape (groove-shaped).

Here, each of the dimensions is defined. Reference characters Ta, Tb, and Tc in FIG. 4 are defined as follows:
Ta: length of the arc portion 22 in the circumferential direction (circumferential length)
Tb: length of the contact region 22b in the circumferential direction (circumferential length)
Tc: depth of the relief portion 22a from a virtual line obtained by extending the arc of the contact region 22b in the circumferential direction The shorter the length of Tb of the contact region 22b becomes (the longer the length of the relief portion 22a becomes), the more the contact area between the stator 12 and the body part 1 reduces. As a result, the compression stress generated in the stator 12 caused by the pressure from the body part 1 concentrates to the vicinity of the contact region 22b. Therefore, the compression stress of the core back 23 in the vicinity of cutout portion 21 away from the contact region 22b is relaxed, and magnetic saturation is relaxed.

The smaller the depth Tc of the relief portion 22a is, the better the configuration becomes, in order not that the magnetic path of the core back 23 becomes shorter. In this embodiment, the depth Tc is set equal to the plate thickness of the stator core plate (0.1 to 1 mm, for example).

Moreover, in the core back 23, three circular through holes 31 are formed close to each of the arc portions 22 other than the ones located in the direction of the main winding wire magnetic pole 28 with respect to the center of the stator in this embodiment. The three through holes 31 are arranged in a row along the arc portion 22. The through hole 31 at the center in the three through holes 31 is provided on the inner circumferential side of the contact region 22b. The through holes 31 on the both ends are provided on the inner circumferential side of the relief portion 22a. That is, the through holes 31 on the both ends are provided on an outer side in the circumferential direction from the contact region 22b (on the cutout portion 21 side). These through holes 31 have a function for relaxing the compression stress caused by the pressure from the body part 1 by their own deformation. However, if there is the through hole 31 in the direction of the main winding wire magnetic pole 28 with respect to the center of the stator, the length of the magnetic path becomes long, which results in the increase in iron loss, whereby efficiency of the single-phase induction motor is lowered. Thus, the through hole 31 is not provided in the arc portion 22 arranged in the direction of the main winding wire magnetic pole 28 with respect to the center of the stator (see FIG. 3).

Figure 5:
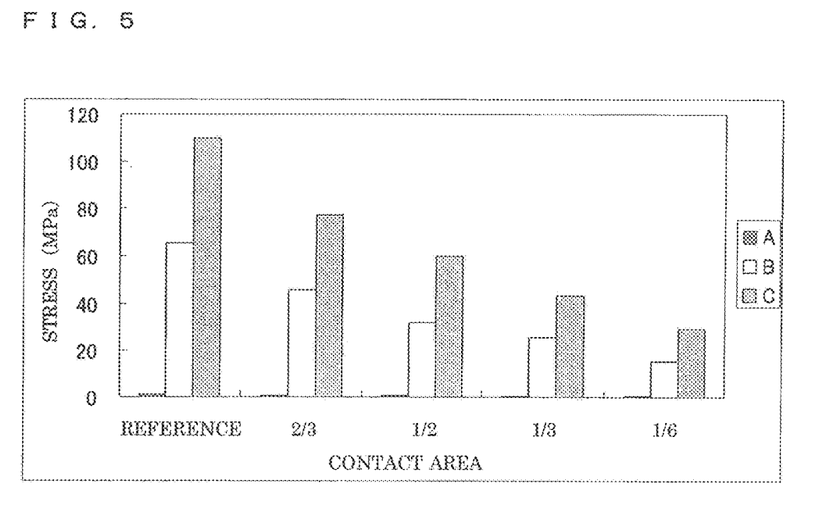
FIG. 5 is a graph illustrating a relationship between a contact area between a body part of a sealed container and the stator and a compression stress generated in portion A, portion B and portion C of the stator in the single-phase induction motor according to embodiment 1 of the present invention.

FIG. 5 is a graph illustrating a relationship between the contact area between the body part 1 of the sealed container 4 and the stator 12 and the compression stress generated in an portion A, a portion B, and a portion C (see FIG. 3) of the stator 12. The lateral axis of the graph indicates the contact area. A "reference" of the lateral axis indicates a case in which the relief portion 22a is not provided (that is, Tb/Ta=1), and "2/3 times", "1/2 times", "1/3 times", and "1/6 times" indicate that Tb/Ta are 2/3, 1/2, 1/3, and 1/6, respectively. Here, the plate thickness t of the stator core plate is assumed to be 0.25 mm. The vertical axis of the graph indicates the stress (MPa). As illustrated in FIG. 3, the portion A of the stator 12 is a teeth portion sandwiched by the two large slots 25 on the inner circumferential side of the arc portion 22, the portion B is the vicinity of the center part in the radial direction of the core back 23 on the inner circumferential side of the arc portion 22, and the portion C is the vicinity of the top portion of the large slot 25 on the inner circumferential side of the cutout portion 21.

As illustrated in FIG. 5, the smaller the contact area between the body part 1 and the stator 12 becomes, the less the compression stress generated in the portion A ("A" in FIG. 5), the portion B ("B" in FIG. 5), and the portion C ("C" in FIG. 5) becomes. That is, it is known that the shorter the length Tb of the contact region 22b becomes (the longer the length of the relief portion 22a becomes), the smaller the compression stress generated in the portion A, the portion B, and the portion C can be made. However, the smaller the contact area between the body part 1 and the stator 12 becomes, the smaller a release load at the shrink-fitting becomes. In order to ensure reliability to the release load, it is assumed that 60 MPa or more is ensured as the compression stress in the portion C. It is known that when the contact area is "1/2 time" (Tb/Ta=1/2), the compression stress becomes smaller than a case in which the contact area is "reference" and "2/3 times", and the compression stress of 60 MPa or more can be ensured in the portion C, which is the most preferable.

The relief portion 22a does not necessarily have to be away from the body part 1 after the stator 12 is fixed to the body part 1 and may be in contact with the body part 1. Even if the relief portion 22a and the body part 1 are in contact with each other, the fit margin to the body part 1 becomes smaller in the portion where the relief portion 22a is formed than the contact region 22b protruding to the outer circumferential side from that, and thus, the pressure from the body part 1 becomes smaller. Therefore, even if the relief portion 22a is in contact with the body part 1, the effect similar to the above can be obtained.

Figure 6:
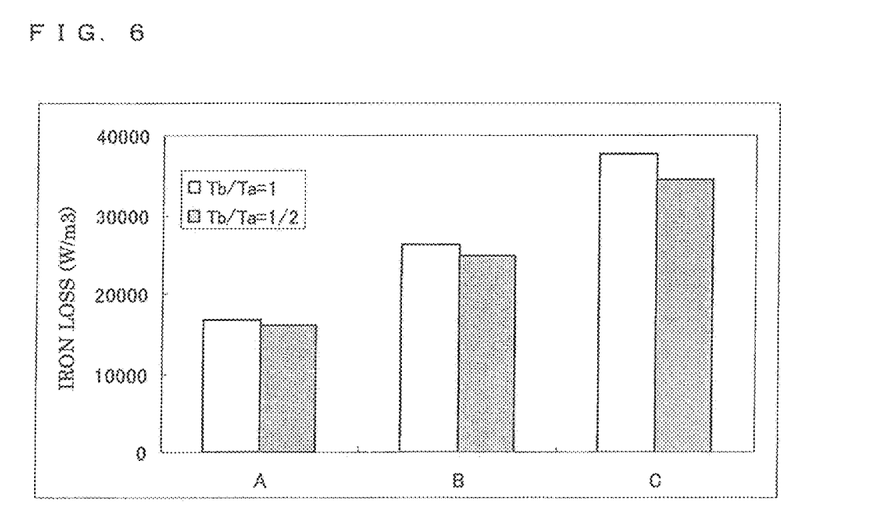
FIG. 6 is a graph illustrating iron loss of the portion A, the portion B, and the portion C of the stator 12 in each of a case of Tb/Ta=1 and a case of Tb/Ta=1/2 in the single-phase induction motor according to embodiment 1 of the present invention.

FIG. 6 is a graph illustrating iron loss of the portion A, the portion B, and the portion C of the stator 12 in each of the case of Tb/Ta=1 and the case of Tb/Ta=1/2. The vertical axis in FIG. 6 indicates iron loss (W/m$^3$). As illustrated in FIG. 6, in the case of Tb/Ta=1/2, iron loss of the stator core 12a is reduced as a whole as compared with the case of Tb/Ta=1, and it is known that iron loss is reduced in each of the portion A ("A" in FIG. 6), the portion B ("B" in FIG. 6), and the portion C ("C" in FIG. 6). Therefore, it is understood that efficiency of the single-phase induction motor can be improved by reduction of iron loss by providing the relief portion 22a on the arc portion 22.

Figure 7:
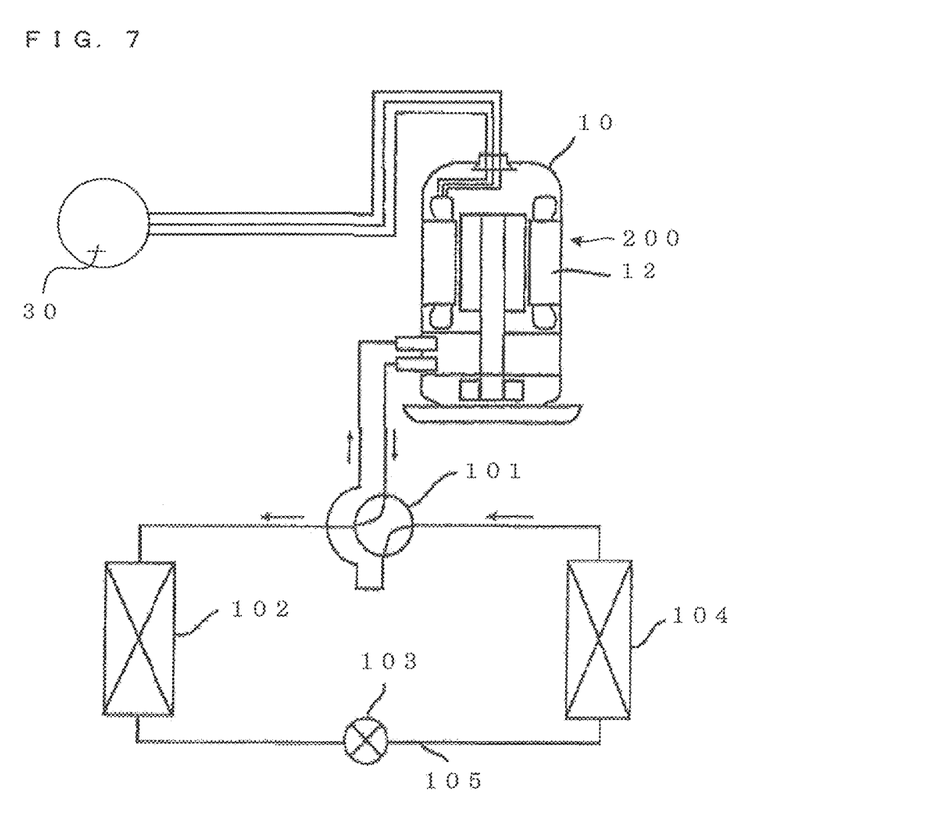
FIG. 7 is a view illustrating a schematic configuration of a refrigeration cycle device in which the hermetic compressor according to embodiment 1 of the present invention is used.

FIG. 7 is a view illustrating a schematic configuration of the refrigeration cycle device in which the hermetic compressor 10 according to this embodiment is used. The refrigeration cycle device is used in an air conditioning apparatus, for example. As illustrated in FIG. 7, the hermetic compressor 10 is connected to a power source 30. The hermetic compressor 10 is driven by power supplied from the power source 30. The refrigeration cycle device includes the hermetic compressor 10, a four-way valve 101 for switching a direction in which the refrigerant flows, an outdoor heat exchanger 102, an expansion device 103 (pressure-reducing device), an indoor heat exchanger 104 and the like. They are connected through a refrigerant pipe 105.

When the air conditioning apparatus is to perform a cooling operation, the refrigerant flows through the hermetic compressor 10, the outdoor heat exchanger 102, the expansion device 103, and the indoor heat exchanger 104 in this order as indicated by arrows in FIG. 7. At this time, the outdoor heat exchanger 102 functions as a condenser, and the indoor heat exchanger 104 functions as an evaporator. On the other hand, when the air conditioning apparatus is to perform a heating operation, the direction in which the refrigerant flows is switched by the four-way valve 101, and the refrigerant flows through the hermetic compressor 10, the indoor heat exchanger 104, the expansion device 103, and the outdoor heat exchanger 102 in this order. At this time, the outdoor heat exchanger 102 functions as an evaporator, and the indoor heat exchanger 104 functions as a condenser.

As the refrigerant, HFC based refrigerants represented by R134a, R410a, R407c and the like or natural refrigerants represented by R744 ($CO_2$), R717 (ammonia), R600a (isobutane), R290 (propane) and the like are used. As the refrigerating machine oil, oil with weak miscibility represented by alkylbenzene based oil or oil with miscibility represented by ester oil and the like are used.

As described above, the single-phase induction motor according to this embodiment includes the stator 12 fixed in the cylindrical frame (the body part 1 in this embodiment) by shrink-fitting or press-fitting, the main winding wire 26 and the auxiliary winding wire 27 provided on the stator 12, and the rotor 11 provided on the inner circumferential side of the stator 12, in which the arc-shaped arc portion 22 and the linear cutout portion 21 are formed on the outer circumference of the stator 12, the arc portion 22 is arranged on the outer circumference of the stator 12 in the direction of the main winding wire magnetic pole 28 with respect to the center of the stator, and the relief portion 22a for reducing the contact area between the arc portion 22 and the inner circumferential surface of the frame is formed on the arc portion 22.

According to this configuration, the compression stress generated in the vicinity of the cutout portion 21 of the stator 12 can be relaxed, and the magnetic flux density in the vicinity of the cutout portion 21 can be reduced and thus, iron loss of the stator 12 can be reduced. Moreover, since the current flowing through the winding wire (the main winding wire 26 and the auxiliary winding wire 27) can be reduced by the reduction of iron loss, copper loss of the stator 12 can be reduced. Therefore, efficiency of the single-phase induction motor can be improved.

Other Embodiments

The present invention is not limited to the above-described embodiment and is capable of various deformations.

In the above-described embodiment, the rotary compressor is cited as an example of the hermetic compressor 10, for example, but the present invention can be applied to other hermetic compressors such as a scroll compressor and the like.

Moreover, each of the above-described embodiments and variations can be combined with each other and put into practice.

REFERENCE SIGNS LIST 1 body part, 2 upper-disc container, 3 lower-disc container, 4 sealed container, 5 cylinder, 6 upper bearing, 7 lower bearing, 8 driving shaft, 9 rolling piston, 10 hermetic compressor, 11 rotor, 12 stator, 12a stator core, 13 oil separation plate, 14 air gap, 15 suction pipe, 16 discharge pipe, 17 glass terminal, 18 winding wire, 19 lead wire, 20 suction muffler, 21 cutout portion, 22 arc portion, 22a relief portion, 22b contact region, 23 core back, 24 small slot, 25 large slot, 26 main winding wire, 27 auxiliary winding wire, 28 main winding wire magnetic pole, 29 auxiliary winding wire magnetic pole, 30 power source, 31 through hole, 101 four-way valve, 102 outdoor heat exchanger, 103 expansion device, 104 indoor heat exchanger, 105 refrigerant pipe, 200 motor element, 300 compression element.

What is claimed is:

1. A single-phase induction motor comprising:
a stator fixed in a cylindrical frame by shrink-fitting or press-fitting;
a main winding wire and an auxiliary winding wire provided on the stator; and
a rotor provided on an inner circumferential side of the stator, wherein:
the stator is configured such that in a cross-section of the stator, an arc-shaped first arc portion, an arc-shaped second arc portion, and a linear cutout portion are formed on an outer circumference of the stator;
the first arc portion is provided on the outer circumference of the stator such that a magnetic pole direction of the main winding wire with respect to a center of the stator intersects with the first arc portion;
the second arc portion is provided on the outer circumference of the stator such that the magnetic pole direction of the main winding wire with respect to the center of the stator does not intersect with the second arc portion;
the stator has a through hole on an inner circumferential side of the second arc portion and has no through hole on an inner circumferential side of the first arc portion; and
a relief portion for reducing a contact area between the first arc portion and an inner circumferential surface of the frame is formed on at least one end portion of the first arc portion, continuously extending to the linear cutout portion.

2. The single-phase induction motor of claim 1, wherein the main winding wire is arranged on the inner circumferential side from the auxiliary winding wire.

3. The single-phase induction motor of claim 1, wherein relief portions are formed on two end portions of the first arc portion in a circumferential direction of the first arc portion.

4. The single-phase induction motor of claim 1, wherein a surface of the relief portion has an arc shape concentric to the first arc portion.

5. A hermetic compressor, comprising a single-phase induction motor, the single-phase induction motor including:
a stator fixed in a cylindrical frame by shrink-fitting or press-fitting;
a main winding wire and an auxiliary winding wire provided on the stator; and
a rotor provided on an inner circumferential side of the stator, wherein:
the stator is configured such that in a cross-section of the stator, an arc-shaped first arc portion, an arc-shaped second arc portion, and a linear cutout portion are formed on an outer circumference of the stator;
the first arc portion is provided on the outer circumference of the stator such that a magnetic pole direction of the main winding wire with respect to a center of the stator intersects with the first arc portion;
the second arc portion is provided on the outer circumference of the stator such that the magnetic pole direction of the main winding wire with respect to the center of the stator does not intersect with the second arc portion;
the stator has a through hole on an inner circumferential side of the second arc portion and has no through hole on an inner circumferential side of the first arc portion; and
a relief portion for reducing a contact area between the first arc portion and an inner circumferential surface of the frame is formed on at least one end portion of the first arc portion, continuously extending to the linear cutout portion.

6. The hermetic compressor of claim 5, wherein a surface of the relief portion has an arc shape concentric to the first arc portion.

7. A refrigeration cycle device, utilizing a hermetic compressor, the hermetic compressor including a single-phase induction motor, the single-phase induction motor including:
a stator fixed in a cylindrical frame by shrink-fitting or press-fitting;
a main winding wire and an auxiliary winding wire provided on the stator; and
a rotor provided on an inner circumferential side of the stator, wherein:
in a cross-section of the stator, an arc-shaped first arc portion, an arc-shaped second arc portion, and a linear cutout portion are formed on an outer circumference of the stator;
the first arc portion is provided on the outer circumference of the stator such that a magnetic pole direction of the main winding wire with respect to a center of the stator intersects with the first arc portion;
the second arc portion is provided on the outer circumference of the stator such that the magnetic pole direction of the main winding wire with respect to the center of the stator does not intersect with the second arc portion;

the stator has a through hole on an inner circumferential side of the second arc portion and has no through hole on an inner circumferential side of the first arc portion; and a relief portion for reducing a contact area between the first arc portion and an inner circumferential surface of the frame is formed on at least one end portion of the first arc portion, continuously extending to the linear cutout portion.

8. The refrigeration cycle device of claim 7, wherein a surface of the relief portion has an arc shape concentric to the first arc portion.

* * * * *